US010864847B2

(12) United States Patent
Mayer

(10) Patent No.: US 10,864,847 B2
(45) Date of Patent: Dec. 15, 2020

(54) MOTOR VEHICLE HEADLIGHT WITH AN INTELLIGENT MOTORWAY FLASHER

(71) Applicant: ZKW Group GmbH, Wieselburg (AT)

(72) Inventor: Peter Mayer, Neumarkt an der Ybbs (AT)

(73) Assignee: ZKW GROUP GMBH, Wieselburg (AT)

(*) Notice: Subject to any disclaimer, the term of this patent is extended or adjusted under 35 U.S.C. 154(b) by 194 days.

(21) Appl. No.: 15/777,727

(22) PCT Filed: Nov. 14, 2016

(86) PCT No.: PCT/AT2016/060109
§ 371 (c)(1),
(2) Date: May 21, 2018

(87) PCT Pub. No.: WO2017/088001
PCT Pub. Date: Jun. 1, 2017

(65) Prior Publication Data
US 2018/0370424 A1 Dec. 27, 2018

(30) Foreign Application Priority Data
Nov. 25, 2015 (AT) .................. 51006/2015

(51) Int. Cl.
B60Q 1/46 (2006.01)
F21S 41/60 (2018.01)

(52) U.S. Cl.
CPC ............... B60Q 1/46 (2013.01); F21S 41/60 (2018.01); B60Q 2300/056 (2013.01);
(Continued)

(58) Field of Classification Search
CPC ...... B60Q 1/46; B60Q 1/143; B60Q 2300/41; B60Q 2300/335; B60Q 2300/334; B60Q 2300/056; B60Q 2300/00; F21S 41/60
See application file for complete search history.

(56) References Cited

U.S. PATENT DOCUMENTS 9,162,610 B2   10/2015 Funk et al.
9,387,796 B2 *  7/2016 Imaeda .................. B60Q 1/143
(Continued)

FOREIGN PATENT DOCUMENTS

AT         4351 U1     6/2001
DE   102011055794 A1   5/2013
(Continued)

OTHER PUBLICATIONS

Office Action in JP2018-526877, dated Apr. 23, 2019, pp. 1-4.
(Continued)

Primary Examiner — Dale W Hilgendorf
Assistant Examiner — Alexander C Bost
(74) Attorney, Agent, or Firm — Eversheds Sutherland (US) LLP

(57) ABSTRACT

The invention relates to a lighting device for a motor vehicle (10) that has one or preferably two such lighting devices that are set up to produce a headlamp flasher signaling function, the lighting device being associated with a controller, the controller controlling the lighting device upon activation of the headlamp flasher signaling function to produce, from the lighting device, a headlamp flasher light distribution, especially in the form of a high beam light distribution (LHV), especially for a defined period of time, in an area in front of the at least one lighting device or in an area in front of the vehicle (10). It is provided that in the case in which the motor vehicle is located on a one-way multilane road (FB) that can only be traveled in one direction (R) and a motor vehicle (20) is driving in front in the lane (FS1) of the motor vehicle (10), the at least one lighting device is set up to produce, in accordance with control commands of the controller (7), a modified headlamp flasher light distribution which only illuminates a subarea (LHV') of the area (LHV)

(Continued)

Figure 1:
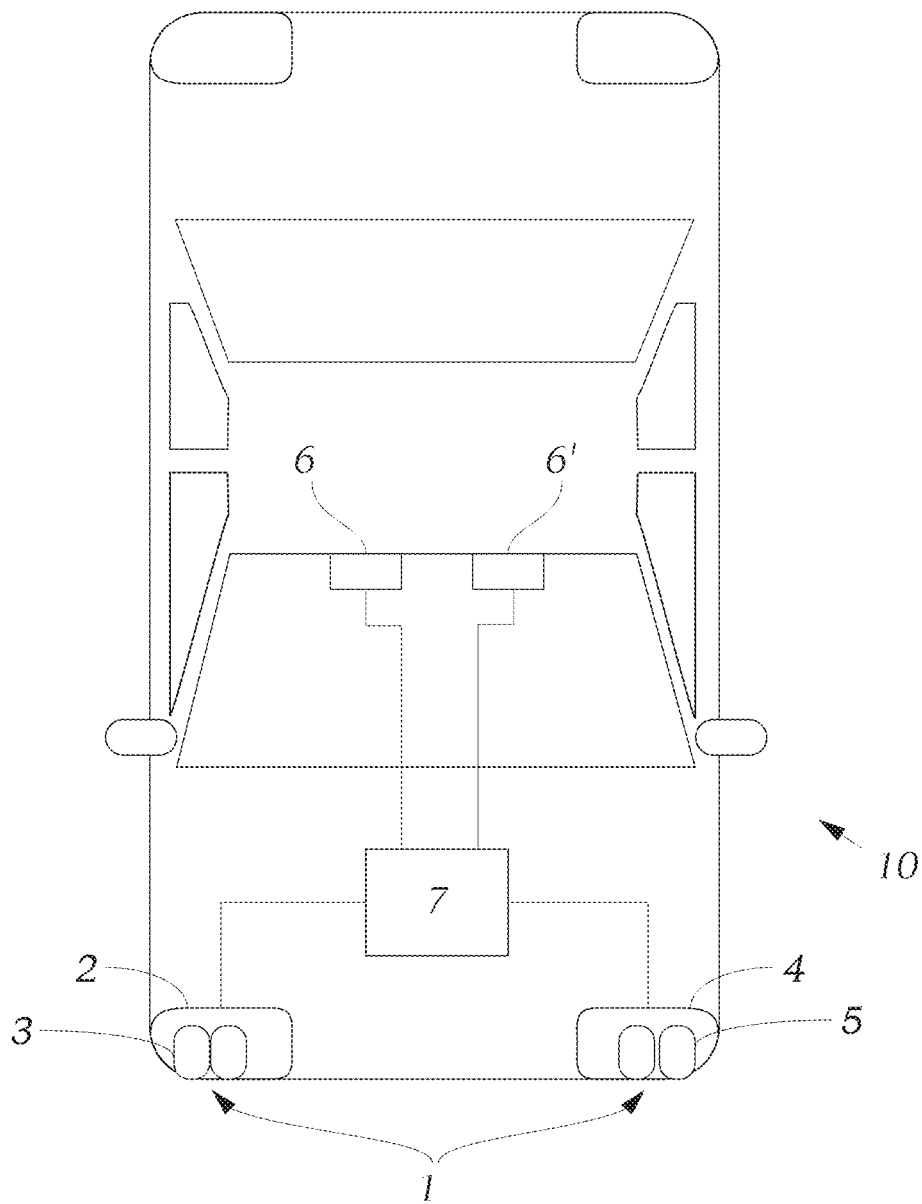

illuminable by the unmodified headlamp flasher light distribution.

13 Claims, 4 Drawing Sheets

(52) U.S. Cl.
CPC .. *B60Q 2300/334* (2013.01); *B60Q 2300/335* (2013.01); *B60Q 2300/41* (2013.01)

(56) References Cited

U.S. PATENT DOCUMENTS

| | | | | |
|---|---|---|---|---|
| 9,527,429 | B2* | 12/2016 | Licsar | B60Q 1/085 |
| 9,809,154 | B2 | 11/2017 | Funk et al. | |
| 9,896,022 | B1* | 2/2018 | Pertsel | G06K 9/00825 |
| 10,131,267 | B2* | 11/2018 | Hoffmann | H05B 45/10 |
| 2008/0084286 | A1* | 4/2008 | Teramura | B60Q 1/085 |
| | | | | 340/438 |
| 2009/0141513 | A1* | 6/2009 | Kim | B60Q 1/085 |
| | | | | 362/507 |
| 2011/0210665 | A1* | 9/2011 | Asquith | B60Q 1/1415 |
| | | | | 315/82 |
| 2012/0116632 | A1* | 5/2012 | Bechtel | B60Q 1/1423 |
| | | | | 701/36 |
| 2012/0275172 | A1* | 11/2012 | Mizuno | B60Q 1/085 |
| | | | | 362/464 |
| 2015/0003087 | A1* | 1/2015 | Futamura | B60Q 1/143 |
| | | | | 362/466 |
| 2015/0009694 | A1* | 1/2015 | Sekiguchi | B60Q 1/143 |
| | | | | 362/466 |
| 2015/0028741 | A1* | 1/2015 | Schmidt | G06K 9/00791 |
| | | | | 315/82 |
| 2015/0028742 | A1* | 1/2015 | Imaeda | B60Q 1/143 |
| | | | | 315/82 |
| 2015/0055357 | A1* | 2/2015 | Nakatani | F21S 41/143 |
| | | | | 362/466 |
| 2015/0124465 | A1* | 5/2015 | Lee | B60Q 1/085 |
| | | | | 362/465 |
| 2015/0197139 | A1* | 7/2015 | Song | B60Q 1/0023 |
| | | | | 362/464 |
| 2015/0241013 | A1* | 8/2015 | Mochizuki | B60Q 1/085 |
| | | | | 362/466 |
| 2016/0023592 | A1* | 1/2016 | Foltin | B60Q 1/143 |
| | | | | 701/49 |
| 2016/0090024 | A1* | 3/2016 | Nagasawa | B60Q 1/143 |
| | | | | 315/82 |
| 2016/0090025 | A1* | 3/2016 | Nagasawa | B60Q 1/143 |
| | | | | 362/466 |
| 2016/0238210 | A1* | 8/2016 | Masuda | F21S 41/143 |
| 2016/0332559 | A1* | 11/2016 | Funk | H05B 45/10 |
| 2016/0368414 | A1* | 12/2016 | Son | F21S 41/255 |
| 2017/0043702 | A1* | 2/2017 | Park | F21S 41/692 |
| 2017/0225608 | A1* | 8/2017 | Stahlin | B60Q 1/14 |
| 2017/0282783 | A1* | 10/2017 | Ravier | F21S 41/16 |

FOREIGN PATENT DOCUMENTS

| | | |
|---|---|---|
| DE | 102013220341 A1 | 4/2015 |
| EP | 2597364 A2 | 5/2013 |
| JP | 2002193032 A | 7/2002 |
| JP | 2013067288 A | 4/2013 |
| JP | 2013252796 A | 12/2013 |
| WO | 2012/147457 A1 | 11/2012 |

OTHER PUBLICATIONS

International Search Report for PCT/AT2016/060109, dated Mar. 6, 2017 (2 pages).
Search Report issued in Austrian Application No. A 51006/2015, dated Nov. 8, 2016 (1 page).

* cited by examiner

MOTOR VEHICLE HEADLIGHT WITH AN INTELLIGENT MOTORWAY FLASHER

The invention relates to a controller for controlling at least one lighting device for a motor vehicle, or for controlling at least one motor vehicle headlight having at least one such lighting device, this at least one lighting device being set up at least to produce a headlamp flasher signaling function, upon activation of which the controller controlling the at least one lighting device or the at least one motor vehicle headlight to produce, from the at least one lighting device, a headlamp flasher light distribution, especially in the form of a high beam light distribution, especially for a defined period of time, in an area in front of the at least one lighting device or in an area in front of the vehicle.

Furthermore, the invention relates to a lighting device for a motor vehicle or for a motor vehicle headlight, this at least one lighting device being set up at least to produce a headlamp flasher signaling function, the lighting device being associated with a controller or comprising a controller, the controller controlling the at least one lighting device upon activation of the headlamp flasher signaling function to produce, from the at least one lighting device, a headlamp flasher light distribution, especially in the form of a high beam light distribution, especially for a defined period of time, in an area in front of the at least one lighting device or in an area in front of the vehicle.

The invention also relates to a motor vehicle headlight that comprises at least one above-described lighting device, and a lighting device system for a motor vehicle, the lighting device system comprising two above-mentioned motor vehicle headlights, a left and a right motor vehicle headlight.

Finally, the invention also relates to a motor vehicle with at least one above-mentioned motor vehicle headlight, especially two such motor vehicle headlights, or with an above-mentioned lighting device system, and a process to control at least one lighting device or at least one motor vehicle headlight or at least one lighting device system.

Motor vehicles have a so-called "headlamp flasher" function. This headlamp flasher function involves briefly producing a headlamp flasher light distribution of the headlights of the motor vehicle ("putting on the high beams"); as a rule, the driver of the motor vehicle does this by activating a corresponding control (light switch). Specifically, this usually involves activating the high beams for a short period of time; accordingly the headlamp flasher light distribution is usually a high beam light distribution that is activated for a short period of time.

The headlamp flasher is used to allow signals to be sent to other road users, for example to draw their attention to certain dangers, traffic situations, etc.

For example, the so-called "flash-to-pass" is also known, which is intended to indicate, by activating the headlamp flasher, to a vehicle (driver) driving in front, as a rule slower, in the same lane, especially on a one-way roadway with two or more lanes, the desire to clear the road for passing, so that it is possible to pass.

Such a one-way road has a "slow" lane (in the case of right side driving this is the lane on the far right, and in the case of left side driving this is the lane on the far left) and one or more passing lanes, the lane on the far left (in the case of right side driving) or the lane on the far right (in the case of left side driving) being the so-called "fast" lane.

For example, as a rule a freeway has two roadways with opposite directions of travel, each roadway having two or more lanes.

In connection with the above-described "flash-to-pass", the headlamp flasher is, as a rule, used when a motor vehicle driving in front is located in a passing lane, especially in the fast lane.

However, using the headlamp flasher, especially in connection with "flash-to-pass", has the disadvantage that the high beam light distribution produced can also blind road users, i.e., the passengers, especially the drivers of motor vehicles in the other lanes of the roadway, which can irritate and/or distract them.

It is one goal of the invention to solve the above-mentioned problem.

This is accomplished with an inventive controller mentioned at the beginning by the controller receiving road information from a road detection device, this road information
  at least comprising information about whether a roadway being traveled by the motor vehicle is a one-way road and whether the roadway has one or more lanes, and/or
  at least comprising information about whether a or the roadway being traveled by the motor vehicle is a one-way road and how many lanes the road has,
and the controller receiving object information from at least one object detection system that observes the surrounding area lying in front of the lighting device or the motor vehicle, the object information comprising at least information,
  about whether a vehicle object, especially a motor vehicle object, is located in the same lane that is being traveled by the motor vehicle, especially directly in front of the motor vehicle, and preferably at what distance the vehicle object, especially the motor vehicle object, is located, and/or
  where on the roadway vehicle objects, especially motor vehicle objects are located, when viewed in the direction of travel from the motor vehicle, and preferably at what distance from the motor vehicle these vehicle objects, especially motor vehicle objects are located,
and, upon activation of the headlamp flasher signaling function, the controller, in the case in which
  the motor vehicle is located on a one-way road with two or more lanes, and
  the lane of the motor vehicle has a vehicle object, especially a motor vehicle object, located in it driving in front of the motor vehicle, especially driving directly in front of it,
controls the at least one lighting device that is set up to produce at least one modified headlamp flasher light distribution, especially a modified high beam light distribution, this modified headlamp flasher light distribution, especially a modified high beam light distribution, illuminating only one or more subareas of the area illuminable by the (unmodified) headlamp flasher light distribution, especially the high beam light distribution, that is, it controls the at least one motor vehicle headlight, to produce, preferably for the defined time duration, a modified headlamp flasher light distribution, especially a modified high beam light distribution, that is modified to illuminate essentially only the vehicle object, especially the motor vehicle object, driving in front of the motor vehicle, especially directly in front of it, in the same lane.

According to the invention, a known high beam light distribution is spatially limited to the road user that is driving directly in front and is blocking the lane. To accomplish this, it is determined whether the motor vehicle whose headlamp flasher is supposed to be activated is located on a two or more lane road, e.g., on an freeway. If a motor vehicle is detected driving in front, especially within a certain angular range and distance range, then upon activation of the headlamp flasher function only the angular range occupied by the vehicle driving in front is illuminated. Vehicles in other lanes are masked or not illuminated, so that the passengers of these vehicles, in particular passengers of the vehicles in slower lanes, especially the slow lane, are not distracted.

Advantageous embodiments of the controller are indicated below, each of which can be realized alone or in any combination:

in the case of a lighting device that constructs a headlamp flasher light distribution, preferably a high beam light distribution, from individual light segments, e.g., light segments lying horizontally next to one another and/or vertically on top of one another, the controller controls the lighting device in such a way that to produce a modified an headlamp flasher light distribution, in particular a modified high beam light distribution, there are light segments that are not produced, i.e., the corresponding areas are not illuminated. A segmented light distribution, e.g., a high beam light distribution, can be produced, for example, with matrix headlights/lighting devices, Pixel-Lite headlights, laser scanning beam headlights, headlights based on Digital Light Processing (DLP) technology, headlights that contain micromirror arrays, etc.;

the object information determined by the object detection system further contains an object angular range that is occupied by or is dependent on a vehicle object, especially a motor vehicle object, driving in front, especially directly in front, in the same lane, an additional lateral offset, e.g., being provided in the latter case to make the illuminated area somewhat wider than the width range of the vehicle driving in front;

the object information determined by the object detection system further contains a distance at which a vehicle object, especially a motor vehicle object driving in front, especially directly in front, in the same lane is located;

in the case in which a vehicle, especially a motor vehicle, is located within a defined angular range, upon activation of the headlamp flasher signaling function the controller controls the at least one lighting device or the at least one motor vehicle headlight so that the modified headlamp flasher light distribution, especially the modified high beam light distribution, is produced, preferably for the defined time period so that essentially only the object angular range is illuminated;

in principle, the modified headlamp flasher light distribution, especially the modified high beam light distribution can be adjusted in a fixed manner. However, it is preferably provided that this light distribution always be adapted to the road conditions (e.g., width of the lane) and/or to the distance of the vehicle driving in front, i.e., in particular that it be flexibly adapted, so that this light distribution preferably can be limited to the motor vehicle driving directly in front;

the controller activates the modified headlamp flasher light distribution, preferably high beam light distribution, only if the vehicle object, especially motor vehicle object, driving directly in front in the same lane is located at a distance d that is less than a specifiable or specified minimum distance dmin. In the case when d is greater than or equal to dmin, the "normal", unmodified headlamp flasher light distribution is activated;

the controller activates the modified headlamp flasher light distribution, preferably high beam light distribution, only if the motor vehicle is located in the fast lane.

This information is preferably determined by means of the road detection device, and is contained in the road information. The inventive spatial limitation is correspondingly only placed on the high beam light distribution if the motor vehicle whose headlamp flasher is activated is located in the fast lane.

Furthermore, this goal is achieved with a lighting device mentioned at the beginning by the fact that according to the invention the controller is in the form of an above-described controller, wherein the at least one lighting device is set up to produce, in accordance with control commands of the controller, at least one modified headlamp flasher light distribution, especially a modified high beam light distribution, which modified headlamp flasher light distribution, especially modified high beam light distribution, illuminates only one or more subareas of the area illuminable by the headlamp flasher light distribution, especially modified high beam light distribution.

Advantageous embodiments of the lighting device are indicated below, each of which can be realized alone or in any combination:

the lighting device comprises at least one object detection system, e.g., an optical image recognition system, or the lighting device is associated with at least one object detection system, e.g., an optical image recognition system, the controller receiving object information from the at least one object detection system, this object detection system observing the surrounding area lying in front of the lighting device or the motor vehicle, the object information comprising at least information about whether a vehicle object, especially a motor vehicle object, is located in front of the motor vehicle, especially directly in front of it, in the same lane that is being traveled by the motor vehicle, and preferably at what distance the vehicle object, especially the motor vehicle object, is located, and/or where on the roadway vehicle objects, especially motor vehicle objects are located, when viewed in the direction of travel from the motor vehicle, and preferably at what distance from the motor vehicle these vehicle objects, especially motor vehicle objects are located;

the lighting device comprises at least one road detection device or the lighting device is associated with at least one road detection device, by means of which road information can be determined and supplied to the controller, the road information comprising at least information about whether a roadway being traveled by the motor vehicle is a one-way road and whether the roadway has one or more lanes, and/or at least information about whether a or the roadway being traveled by the motor vehicle is a one-way road and the number of lanes the roadway has;

the lighting device is set up to construct the headlamp flasher light distribution, especially the high beam light distribution and/or the modified headlamp flasher light distribution, especially the modified high beam light distribution, from individual light segments, e.g., light segments lying horizontally next to one another and/or vertically on top of one another;

the road detection device comprises at least one optical image recognition system, e.g., at least one camera or at least one camera system, and/or at least one satellite-based positioning system, e.g. a GPS, and/or at least one Car-to-Car Communication System. The object detection system and road detection device can be realized separately but also together, e.g., by a camera or a camera system (i.e., one camera/a camera system performs both functions) or can comprise a camera or a camera system. In a supporting or supplementary role, still other devices such as GPS, Car-to-Car communication, etc., can be provided, and/or vehicle data, such as, e.g., vehicle speed, radius of a curve, etc., can be taken into consideration.

the lighting device is in the form of a motor vehicle headlight.

Furthermore, the goal mentioned at the beginning is achieved with a motor vehicle headlight mentioned at the beginning, this motor vehicle headlight comprising at least one such lighting device.

The goal mentioned at the beginning is also achieved with a motor vehicle lighting device system mentioned at the beginning that comprises two motor vehicle headlights, a left and a right motor vehicle headlight, the invention providing that at least one motor vehicle headlight, preferably both motor vehicle headlights of the lighting device system, comprise(s) at least one above-described lighting device system, the lighting device system comprising at least one above-described controller or the lighting device system being associated with at least one above-described controller, and the lighting device system being associated with at least one object detection system or the lighting device system comprising at least one object detection system, the controller receiving object information from the at least one object detection system, this object detection system observing the surrounding area lying in front of the lighting device or the motor vehicle, the lighting device system being associated with at least one road detection device or the lighting device comprising at least one road detection device, the controller receiving road information from the at least one road detection device.

Furthermore, the mentioned goal is also achieved by a motor vehicle with at least one, especially two motor vehicle headlights as described above, or with an above-described lighting device system.

Finally, the inventive goal is also achieved with a process mentioned at the beginning, this inventive process comprising the following steps, which are preferably carried out at least partly simultaneously:

determining road information, preferably with a road detection device, this road information comprising
at least information about whether a roadway being traveled by the motor vehicle is a one-way road and whether the roadway has one or more lanes, and/or
at least information about whether a or the roadway being traveled by the motor vehicle is a one-way road and how many lanes the road has, determining object information, preferably with at least one object detection system that observes the surrounding area lying in front of the lighting device or the motor vehicle, the object information comprising at least information,
about whether a vehicle object, especially a motor vehicle object, is located in front of the motor vehicle, especially directly in front of it, in the same lane that is being traveled by the motor vehicle, and preferably at what distance the vehicle object, especially the motor vehicle object, is located, and/or
where on the roadway vehicle objects, especially motor vehicle objects are located, when viewed in the direction of travel from the motor vehicle, and preferably at what distance from the motor vehicle these vehicle objects, especially motor vehicle objects are located, Evaluating the road information and the object information, preferably by means of a controller, Controlling the at least one lighting device or the at least one motor vehicle headlight or the at least one lighting device system, preferably by means of a controller or the controller so that
upon activation of a headlamp flasher signaling function, a headlamp flasher light distribution, especially in the form of a high beam light distribution, is produced, especially for a defined period of time, in an area in front of the at least one lighting device or in an area in front of the vehicle, this light distribution being modified in the case in which evaluation of the road information and the object information finds that
the motor vehicle is located on a one-way road with two or more lanes, and
the lane of the motor vehicle has a vehicle object, especially a motor vehicle object, located in it driving in front of the motor vehicle, especially driving directly in front of it, and the thus modified headlamp flasher light distribution, especially the thus modified high beam light distribution that is produced essentially illuminating only the vehicle object, especially motor vehicle object driving in front, especially directly in front, in the lane of the motor vehicle.

Preferably, road information and object information are constantly determined and be evaluated. Depending on the result of the evaluation at the point in time when the headlamp flasher signaling function is activated, either the normal unmodified headlamp flasher light distribution or the modified headlamp flasher light distribution is turned on.

Figure 2:
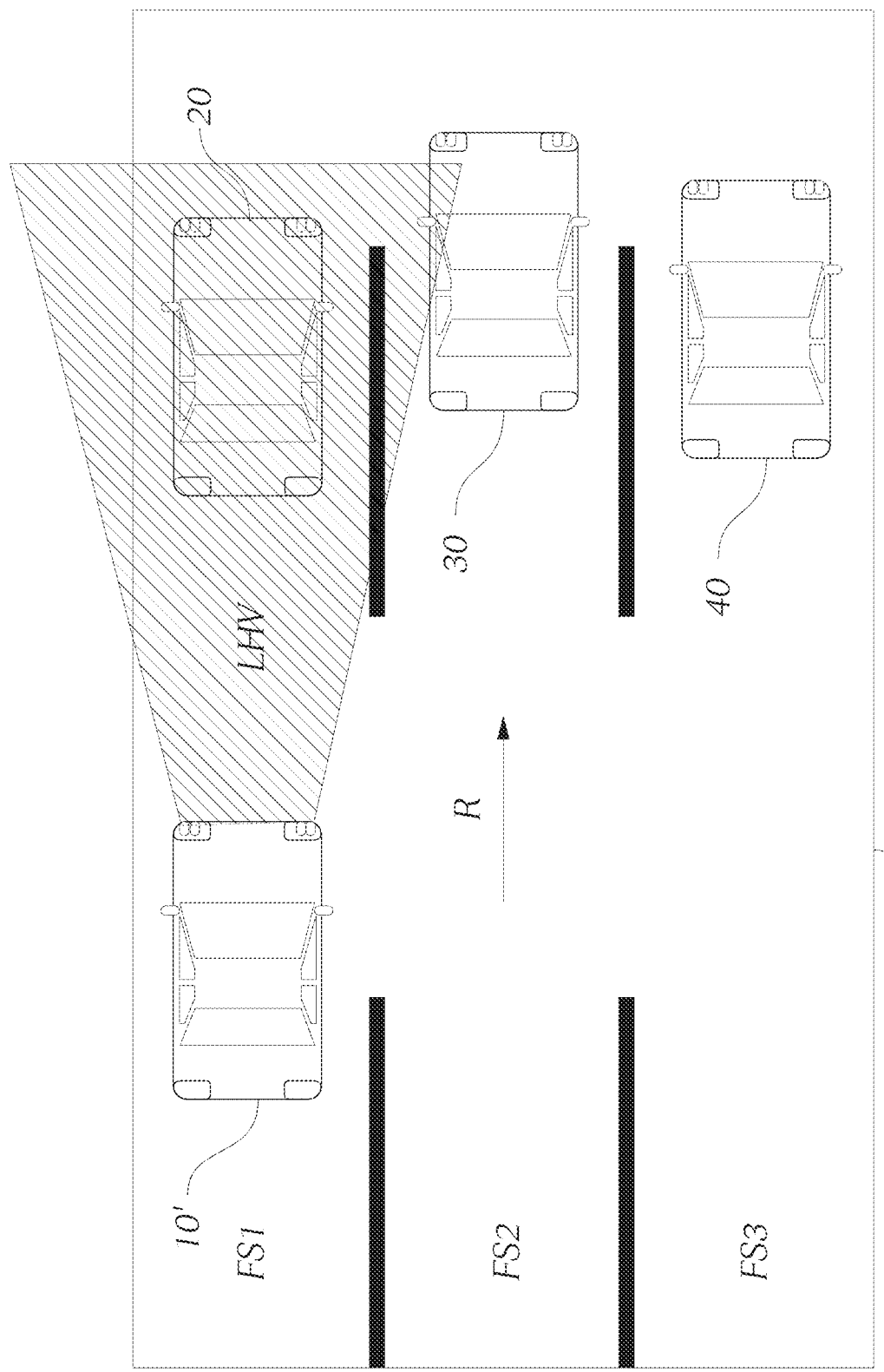
Figure 3:
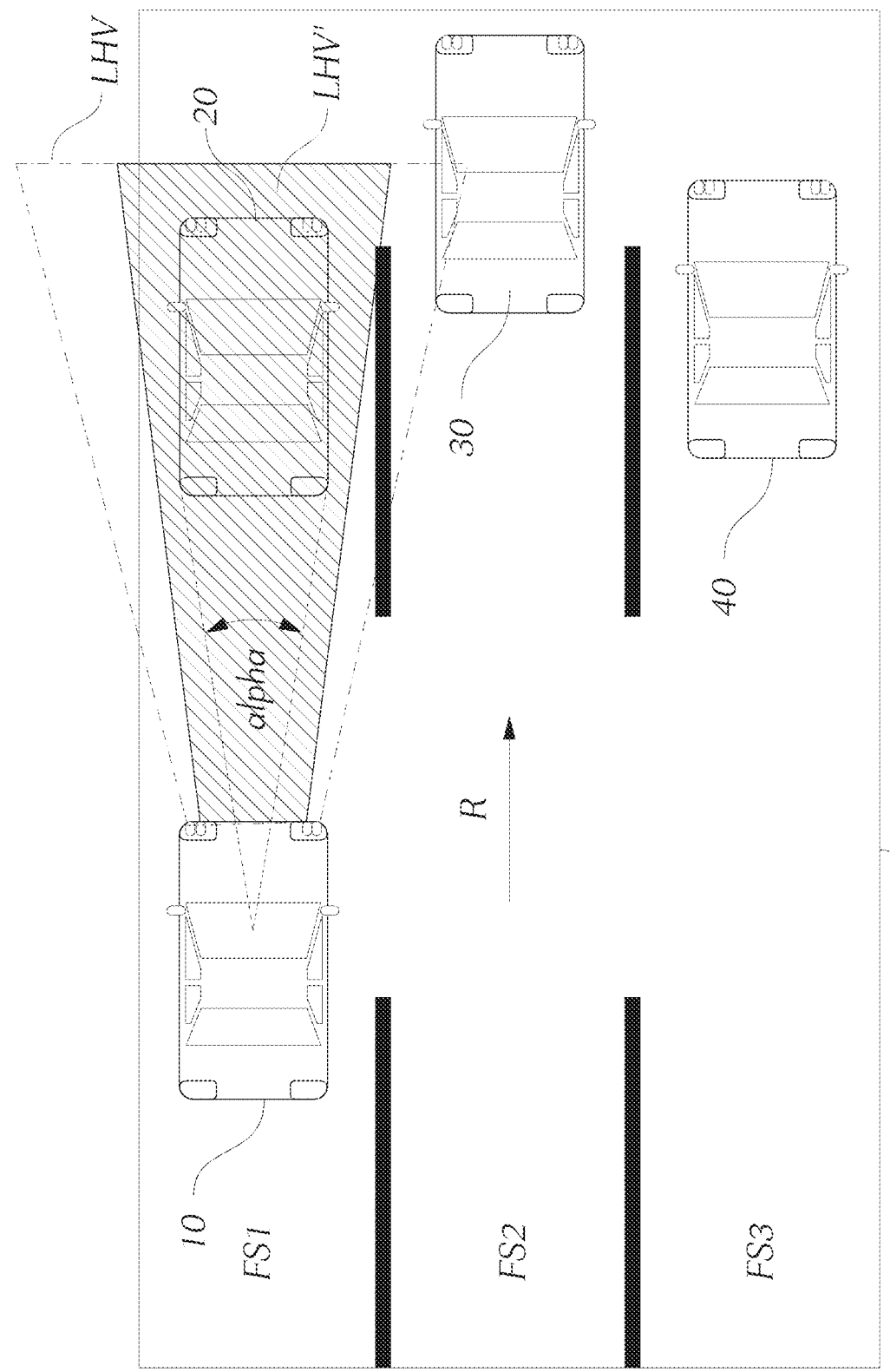
Figure 4:
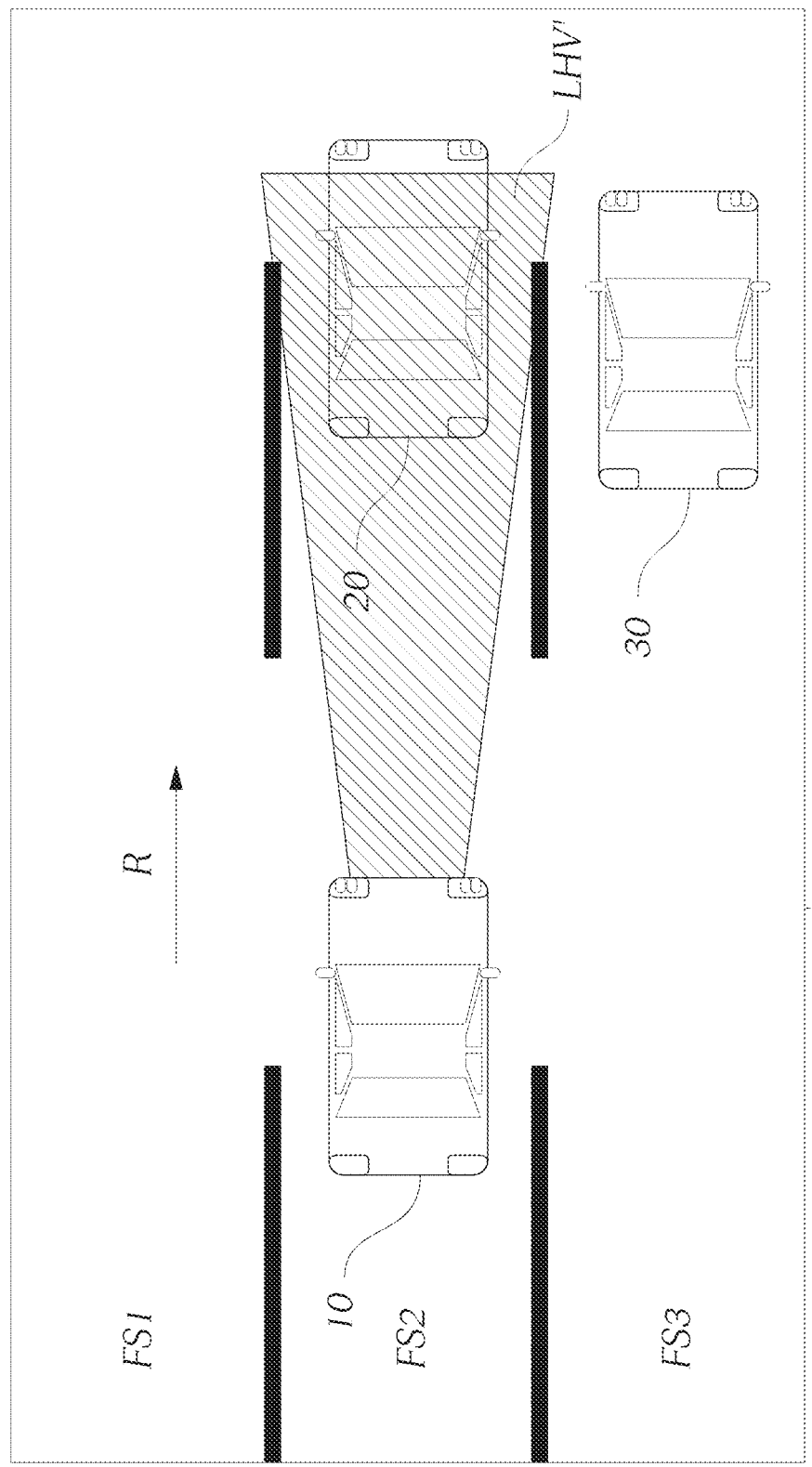

The invention is described in detail below using the drawing. The figures are as follows:

FIG. 1 a schematic top view of an inventive motor vehicle;

FIG. 2 a example of a traffic situation and the use of a prior art headlamp flasher;

FIG. 3 the traffic situation from FIG. 2 when an inventive headlamp flasher is used; and FIG. 4 another example of a traffic situation when an inventive headlamp flasher is used.

FIG. 1 shows an inventive motor vehicle 10. This motor vehicle 10 has a lighting device system 1, which consists of two motor vehicle headlights 2, 4, a left and a right motor vehicle headlight. In the embodiment shown, every headlight 2, 4 has a lighting device 3, 5, e.g., in the form of a light module, these lighting devices 3, 5 being set up to be able to realize a headlamp flasher signaling function. In this connection, the lighting devices 3, 5 are especially set up to produce a headlamp flasher light distribution, namely a high beam light distribution in the specific example.

Furthermore, the motor vehicle 10 has a controller 7, which control the lighting devices 3, 5, and preferably the entire headlights 2, 4. For example, upon activation of the headlamp flasher function by the vehicle driver, the controller 7 controls the lighting devices 3, 5 so that the high beam light distribution is turned on for a certain short period of time, that is, the high beams of the headlights 2, 4 are correspondingly turned on.

The controller 7 is associated with an object detection system 6 from which the controller 7 receives object information that the object detection system 6 determines while observing the surrounding area lying in front of the motor vehicle 10.

Furthermore, the controller 7 is associated with a road detection device 6' from which the controller 7 receives road information.

The object detection system 6 typically comprises one or more cameras that observe the surrounding area, and from this observation the object detection system 6 can detect various objects in front of the motor vehicle 10, however especially at least other motor vehicles. As in the presented example, the object detection system 6 typically comprises its own computing unit that performs this object detection. However, it can also be provided that the object detection system is functionally divided, and the at least one camera sends the picture information that is picked up, e.g., to a central computing unit or, e.g., also to the controller, where the real object detection is performed.

Alternatively or in addition to at least a camera, the object detection system can also comprise one or more suitable sensors, e.g., distance sensors, which can determine the necessary information.

The object detection system can alternatively or in addition to the previously mentioned options also consist of car-to-car communication, through which the vehicles communicate their position, or the object detection system can also consist of a communications system with a central entity that has information about vehicle positions and makes this available to other vehicles.

Furthermore, the motor vehicle 10 has a road detection device 6' to determine road information, this road detection device 6' comprising, e.g., an optical image recognition system, e.g., at least one camera or at least one camera system, and/or at least one satellite-based positioning system, e.g. a GPS, and/or at least one Car-to-Car Communication System. The road detection device 6' can have its own camera(s) or it can resort to the camera(s) of the object detection system 6. In a supporting role, it is also possible to take into consideration vehicle data, such as, e.g., vehicle speed, radius of a curve, etc.

FIG. 2 shows a traffic situation on a (one-way) roadway FB, e.g., a freeway. The roadway is being traveled in one direction R and has multiple lanes, in the specific example three lanes FS1, FS2, FS3. In the example shown with right side driving, the (right) lane FS3 is the slow lane, the lanes FS2, FS1 are the "faster" lanes for passing, the left lane FS1 representing the "fast" lane, on which it is provided that motor vehicles can drive the fastest.

In the example shown, motor vehicles 20, 30, 40 are located in all three lanes FS1, FS2, FS3, and a faster motor vehicle 10' is approaching from behind. This motor vehicle 10' has prior art lighting devices, which produce a high beam light distribution upon activation of the headlamp flasher. As shown in FIG. 2, the motor vehicle 10' uses the headlamp flasher to signal to the motor vehicle 20 driving in front in the same lane FS1 that it wants to pass.

However, when it does so, the high beam light cone LHV also illuminates the motor vehicle 30 that is located in the adjacent middle lane FS2, which can blind or distract the driver of the motor vehicle 30 in the middle lane FS2.

An inventive motor vehicle 10 now has lighting devices 3, 5, which are set up to produce, if there are corresponding control commands from the controller 7, a modified headlamp flasher light distribution, i.e., a modified high beam light distribution LHV' that only illuminates a subarea LHV' of the area LHV illuminated by the (unmodified) headlamp flasher light distribution, especially high beam light distribution LHV.

It is especially simple to realize this with lighting devices 3, 5, which construct light distributions, especially the high beam light distribution, from individual light segments, e.g., light segments lying horizontally next to one another and/or vertically on top of one another, since in this case producing a modified high beam distribution involves activating not all light segments, but rather only a subset of all light segments, or if "normal" high beams are already activated, it involves turning off part of the activated light segments.

FIG. 3 shows an inventive motor vehicle 10, which is in the situation already described in connection with FIG. 2. The controller 7 receives road information from the road detection device 6', this road information comprising information about whether the roadway FB being traveled by the motor vehicle 10 is a one-way road that can only be traveled in one direction of travel R, and whether the roadway FB has one or more lanes FS1, FS2, FS3, and/or information about whether the roadway FB being traveled by the motor vehicle 10 is a one-way road that can only be traveled in one direction of travel R, and the number of lanes FS1, FS2, FS3 the roadway FB has. Preferably, the road information also contains information identifying the lane FS1 in which the motor vehicle 10 is located.

Furthermore, the controller 7 receives object information from the object detection system 6, the object information comprising at least information about whether a vehicle object, especially a motor vehicle object or a motor vehicle 20 is located in front of the motor vehicle 10 in the same lane FS1 that is being traveled by the motor vehicle 10, and preferably the distance at which the motor vehicle 20 is located.

The controller 7 is set up so that now, upon activation of the headlamp flasher signaling function, in the case in which the motor vehicle 10 is located on a one-way road FB that can only be traveled in one direction R and that has two or more lanes FS1, FS2, FS3, and a motor vehicle object 20 driving in front of the motor vehicle 10, especially directly in front of it, is located in the lane FS1 of the motor vehicle 10, it controls the lighting devices 3, 5 or the motor vehicle headlights 2, 4, preferably for the defined time period of the headlamp flasher signaling, to produce a modified headlamp flasher light distribution, especially a modified high beam light distribution LHV', that is modified so that essentially only the motor vehicle object 20 driving in front, especially directly in front in the lane FS1 of the motor vehicle 10, is illuminated.

FIG. 3 illustrates exactly such a scenario, so that upon activation of the headlamp flasher instead of the high beam light distribution LHV from FIG. 2, a spatially limited high beam light distribution LHV' according to FIG. 3 is produced.

As can further be seen in FIG. 3, it can preferably be provided that the object information determined by the object detection system 6 further contains an object angular range alpha that is occupied by the motor vehicle object 20 driving in front in the same lane FS1. An additional lateral offset is added to this, so that the illuminated area LHV' is somewhat wider than the width of the motor vehicle 20 driving in front.

That is, in the case shown in which a motor vehicle 20 is located within a defined angular range, upon activation of the headlamp flasher signaling function the controller 6 controls the at least one, as a rule both lighting devices 3, 5 or motor vehicle headlights 2, 4, so that the modified headlamp flasher light distribution, especially the modified high beam light distribution LHV', is produced, preferably for the defined time period, so that essentially only the object angular range alpha is illuminated. Here "essentially" means that either exactly the object angular range alpha or a somewhat wider range is illuminated, as is shown in FIG. 3 and described above, so that vehicles 30 in adjacent lanes FS2 are not illuminated.

FIG. 3 shows the case in which the inventive motor vehicle 10 is located in the fast lane FS1. It can be provided that the controller 7 activates the modified headlamp flasher light distribution only if the motor vehicle 10 is located exactly in the fast lane. The inventive spatial limitation is correspondingly only placed on the high beam light distribution if the motor vehicle whose headlamp flasher is activated is located in the fast lane.

FIG. 4 shows a scenario in which the invention is not limited to the above-described optional feature according to which the spatial limitation is placed on the headlamp flasher light distribution only when the inventive motor vehicle 10 is located in the fast lane FS1.

FIG. 4 shows the motor vehicle 10 in the middle lane FS2 of a roadway as described in connection with FIGS. 2 and 3, with a motor vehicle 20 driving directly in front in the same lane FS2. The controller 7 detects that the roadway FB is a one-way road that can only be traveled in one direction R, that the roadway FB has multiple lanes, namely three lanes FS1, FS2, FS3, and that a motor vehicle 20 is driving directly in front. Accordingly, upon activation of the headlamp flasher, what is activated is not a high beam light distribution, but rather a spatially limited high beam distribution LHV', so that the light cone does not illuminate a motor vehicle 30 in the adjacent lane FS3.

The invention claimed is:

1. A controller (7) for controlling a motor vehicle headlight (10) comprising a lighting device (3, 5) configured to produce a headlamp flasher signaling function, wherein:
   the controller is configured, upon activation of the headlamp flasher signaling function, to control the lighting device (3, 5) so that the lighting device (3, 5) produces a headlamp flasher light distribution in the form of a high beam light distribution (LHV) for a defined period of time in an area in front of the lighting device (3, 5) or in an area in front of a vehicle (10),
   the controller (7) is configured to receive road information from a road detection device (6, 6'), wherein the road information comprises (i) information about whether a roadway (FB) being traveled by the vehicle (10) is a one-way road that can only be traveled in one direction of travel (R) and whether the roadway (FB) has one or more lanes (FS1, FS2, FS3), and/or (ii) information about whether the roadway (FB) being traveled by the vehicle (10) is a one-way road that can only be traveled in one direction of travel (R) and how many lanes (FS1, FS2, FS3) the road (FB) has,
   the controller (7) is configured to receive object information from an object detection system (6) that observes a surrounding area in front of the lighting device (3, 5) or the vehicle (10), wherein the object information comprises (i) information about whether a vehicle object is located in front of the vehicle (10) in a lane (FS1) that is the same as the one being traveled by the vehicle (10) and at what distance the vehicle object is located from the vehicle and/or (ii) information about where on the roadway (FB) the vehicle object is located when viewed in a direction of travel (R) from the vehicle (10) and at what distance (d) from the vehicle (10) the vehicle object is located, and
   the controller (7), upon activation of the headlamp flasher signaling function, is configured such that when
      the vehicle (10) is located on a one-way road (FB) that can only be traveled in one direction (R) with two or more lanes (FS1, FS2, FS3), and
      the lane (FS1) of the vehicle (10) has the vehicle object located in front of the vehicle (10),
   the controller (7) controls the lighting device (3, 5) to produce a modified headlamp flasher light distribution comprising a modified high beam light distribution (LHV') that illuminates only one or more subareas (LHV') of an area (LHV) illuminated by the headlamp flasher light distribution to produce for a defined time duration the modified high beam light distribution (LHV') to illuminate only the vehicle object driving in front and in the same lane (FS1) as the vehicle (10).

2. The controller according to claim 1, wherein the lighting device constructs the high beam light distribution (LHV) from individual light segments, which are light segments lying horizontally next to one another and/or vertically on top of one another, and wherein the controller (7) is configured to control the lighting device (3, 5) to produce the modified high beam light distribution (LHV) such that there are light segments that are not produced.

3. The controller according to claim 1, wherein the object information determined by the object detection system (6) comprises an object angular range (alpha) that is occupied by or is dependent on the vehicle object driving in front of and in the same lane (FS1) as the vehicle.

4. The controller according to claim 1, wherein the object information determined by the object detection system (6) comprises a distance at which the vehicle object is located driving in front and in the same lane (FS1) as the vehicle.

5. The controller according to claim 3, wherein when the vehicle object is located within the object angular range, upon activation of the headlamp flasher signaling function, the controller (6) is configured to control the lighting device (3, 5) so that the modified high beam light distribution (LHV') is produced for the defined time duration so that only the object angular range is illuminated.

6. The controller according to claim 1, wherein the controller (7) is configured to activate the modified headlamp flasher light distribution only if the vehicle object is driving directly in front in the same lane (FS1) as the vehicle and is located at a distance that is less than a specifiable or specified minimum distance.

7. The controller according to claim 1, wherein the controller (7) is configured to activate the modified headlamp flasher light distribution only if the vehicle (10) is located in a fast lane.

8. A lighting device operably associated with the controller according to claim 1.

9. A motor vehicle headlight that comprises the lighting device according to claim 8.

10. A lighting device system (1) for a motor vehicle (10), the lighting device system (1) comprising two motor vehicle headlights (2, 4) comprising a left and a right motor vehicle headlight, wherein:
   the two motor vehicle headlights (2, 4) each comprise the lighting device (3, 5) according to claim 8, and
   the lighting device system (1) is operably associated with the object detection system (6), wherein the controller (7) which is configured to receive object information from the object detection system (6), which is configured to observe the surrounding area lying in front of the lighting device (3, 5) or the vehicle (10), and
   the lighting device system (1) is operably associated with the road detection device (6, 6'), wherein the controller (7) is configured to receive road information from the road detection device (6, 6').

11. A motor vehicle (10) comprising the two motor vehicle headlights (2, 4) according to claim 10.

12. A method for controlling a lighting device (3, 5), the method comprising:

determining road information with a road detection device (6, 6'), the road information comprising (i) information about whether a roadway (FB) being traveled by a vehicle (10) is a one-way road that can only be traveled in one direction of travel (R) and whether the roadway (FB) has one or more lanes (FS1, FS2, FS3), and/or (ii) information about whether the roadway (FB) being traveled by the vehicle (10) is a one-way road that can only be traveled in one direction of travel (R) and how many lanes (FS1, FS2, FS3) the roadway (FB) has;

determining object information with an object detection system (6) that observes a surrounding area in front of the lighting device (3, 6) or the vehicle (10), the object information comprising information about (i) whether a vehicle object is located in front of the vehicle (10) and in the same lane (FS1) that is being traveled by the vehicle (10) and at what distance the vehicle object is located from the vehicle, and/or (ii) where on the roadway (FB) the vehicle object is located, when viewed in a direction of travel (R) from the vehicle (10) and at what distance from the vehicle (10) the vehicle object is located;

evaluating the road information and the object information by a controller (7);

controlling the lighting device by the controller (7);

upon activation of a headlamp flasher signaling function, producing a headlamp flasher light distribution in the form of a high beam light distribution (LHV) for a defined period of time in an area in front of the lighting device (3, 5) or in an area in front of the vehicle (10) and modifying the headlamp flasher light distribution, if evaluation of the road information and the object information finds that (i) the vehicle (10) is located on a one-way road (FB) that can only be traveled in one direction (R) with two or more lanes (FS1, FS2, FS3), and (ii) a lane (FS1) of the vehicle (10) has the vehicle object located in the lane and driving in front of the vehicle (10), to produce a modified headlamp flasher light distribution, which illuminates only the vehicle object driving in front of and in the lane (FS1) of the vehicle (10).

13. The lighting device according to claim 8, wherein the road detection device comprises an optical image recognition system comprising a camera or camera system, a GPS or other satellite-based positioning system, a Car-to-Car Communication System, or a combination thereof.

\* \* \* \* \*